US008860731B1

(12) United States Patent
Cohen Bengio et al.

(10) Patent No.: US 8,860,731 B1
(45) Date of Patent: Oct. 14, 2014

(54) REFINING ANIMATION (75) Inventors: Julien F. Cohen Bengio, San Francisco, CA (US); Frederic P. Pighin, Sausalito, CA (US); Michael Koperwas, San Francisco, CA (US)

(73) Assignee: Lucasfilm Entertainment Company Ltd., San Francisco, CA (US)

( * ) Notice: Subject to any disclaimer, the term of this patent is extended or adjusted under 35 U.S.C. 154(b) by 909 days.

(21) Appl. No.: 12/793,249

(22) Filed: Jun. 3, 2010

Related U.S. Application Data (60) Provisional application No. 61/288,721, filed on Dec. 21, 2009.

(51) Int. Cl.
*G06T 13/00* (2011.01)

(52) U.S. Cl.
CPC .................................. *G06T 13/00* (2013.01)
USPC ........................ 345/473; 345/419; 345/420

(58) Field of Classification Search
USPC .......................................... 345/419, 420, 473
See application file for complete search history.

(56) References Cited

U.S. PATENT DOCUMENTS

| | | | | |
|---|---|---|---|---|
| 6,535,215 B1 * | 3/2003 | DeWitt et al. | ................. | 345/473 |
| 6,614,428 B1 * | 9/2003 | Lengyel | ........................ | 345/420 |
| 7,292,250 B2 * | 11/2007 | Sepulveda | .................... | 345/473 |
| 7,307,633 B2 * | 12/2007 | Anderson et al. | ............. | 345/473 |
| 7,386,429 B1 * | 6/2008 | Fujisaki | ........................... | 703/6 |
| 7,391,421 B2 * | 6/2008 | Guo et al. | ...................... | 345/473 |
| 7,515,155 B2 * | 4/2009 | Anderson et al. | ............. | 345/473 |
| 7,589,720 B2 * | 9/2009 | Zhou et al. | .................... | 345/423 |
| 7,872,654 B2 * | 1/2011 | Scapel et al. | ................... | 345/473 |
| 8,054,311 B1 * | 11/2011 | Sheffler et al. | ................ | 345/473 |
| 2004/0095352 A1 * | 5/2004 | Huang | ........................... | 345/473 |
| 2004/0169656 A1 * | 9/2004 | David Piponi et al. | ....... | 345/473 |
| 2006/0139347 A1 * | 6/2006 | Choi et al. | ..................... | 345/419 |
| 2006/0274070 A1 * | 12/2006 | Herman et al. | ................ | 345/474 |
| 2007/0268293 A1 * | 11/2007 | Miller et al. | ................... | 345/473 |
| 2010/0149179 A1 * | 6/2010 | de Aguiar et al. | ............. | 345/420 |
| 2010/0214313 A1 * | 8/2010 | Herman et al. | ................ | 345/593 |
| 2010/0259546 A1 * | 10/2010 | Yomdin et al. | ................ | 345/473 |

OTHER PUBLICATIONS

Jose Mario De Martino, et al.; Facial animation based on context-dependent visemes; (2006); State University of Campinas, pp. 971-980.*

* cited by examiner

*Primary Examiner* — Kimbinh T Nguyen
(74) *Attorney, Agent, or Firm* — Kilpatrick Townsend & Stockton LLP (57) ABSTRACT

A system includes a computing device that includes a memory configured to store instructions. The computing device also includes a processor configured to execute the instructions to perform a method that includes receiving a model that represents the geometry of an animated character and represents a primary deformation applied the geometry of the character. The applied primary deformation is relative to a rest geometry of the character. The method also includes applying a secondary deformation to the geometry of the received character model. The applied secondary deformation is relative to the primary deformation applied to the geometry of the character.

33 Claims, 7 Drawing Sheets

REFINING ANIMATION

CLAIM OF PRIORITY

This application claims priority under 35 USC §119(e) to U.S. patent application Ser. No. 61/288,721, filed on Dec. 21, 2009, the entire contents of which are hereby incorporated by reference.

TECHNICAL FIELD

This document relates to techniques for refining models for animation production.

BACKGROUND

Animation projects such as online applications (e.g., video game titles) and off-line applications (e.g., animated film productions) may call for a significant number of animations with varying levels of details. For example, characters located in the foreground of a particular scene may require a significant amount of detail to appear realistic and hold the attention of the casual viewer. Alternatively, an animated character located in a scene's background may be roughly approximated for rendering since the viewer's ability to identify the character may not be crucial. Such scenarios may be particularly valid for character faces, which may need to be recognized in the foreground and less likely when in the background. As such, in some instances, animators may need to take great care during character preparation for animation projects.

SUMMARY

The systems and techniques described here relate to flexible and efficient techniques for refining models for animations to produce detailed character features such as facial expressions.

In one aspect, a computer-implemented method includes receiving a model that represents the geometry of an animated character and represents a primary deformation applied the geometry of the character. The applied primary deformation is relative to a rest geometry of the character. The method also includes applying a secondary deformation to the geometry of the received character model. The applied secondary deformation is relative to the primary deformation applied to the geometry of the character.

Implementations may include any or all of the following features. Applying the secondary deformation may include applying a transform to a portion of the geometry of the received character model. The primary deformation and the secondary deformation may be applied to equivalent portions of the geometry of the character. The primary deformation and the secondary deformation may be applied to different portions of the geometry of the character. The primary deformation may include adjusting a shape associated with the model, applying a skin to the model, or another similar operation. The primary deformation may be preserved as the character model is animated. The secondary deformation may be preserved as the character model is animated. The method may also include identifying the geometry of the received character model applied with the secondary deformation as being an invariant pose. The method may also include, upon adjusting the geometry of the received character model applied with the secondary deformation, returning the adjusted geometry to the invariant pose. A user interaction may identify a portion of the geometry of the received character model for applying the secondary deformation. The character model may represents one or more objects, such as a face of the animated character.

In another aspect, a computer program product tangibly embodied in an information carrier and comprising instructions that when executed by a processor perform a method that includes receiving a model that represents the geometry of an animated character and represents a primary deformation applied the geometry of the character. The applied primary deformation is relative to a rest geometry of the character. The method also includes applying a secondary deformation to the geometry of the received character model. The applied secondary deformation is relative to the primary deformation applied to the geometry of the character.

The another aspect, a system includes a computing device that includes a memory configured to store instructions. The computing device also includes a processor configured to execute the instructions to perform a method that includes receiving a model that represents the geometry of an animated character and represents a primary deformation applied the geometry of the character. The applied primary deformation is relative to a rest geometry of the character. The method also includes applying a secondary deformation to the geometry of the received character model. The applied secondary deformation is relative to the primary deformation applied to the geometry of the character.

Details of one or more implementations are set forth in the accompanying drawings and the description below. Other features, aspects and advantages will be apparent from the description and drawings, and from the claims.

DESCRIPTION OF DRAWINGS

Like reference symbols in the various drawings indicate like elements.

DETAILED DESCRIPTION

Figure 1:
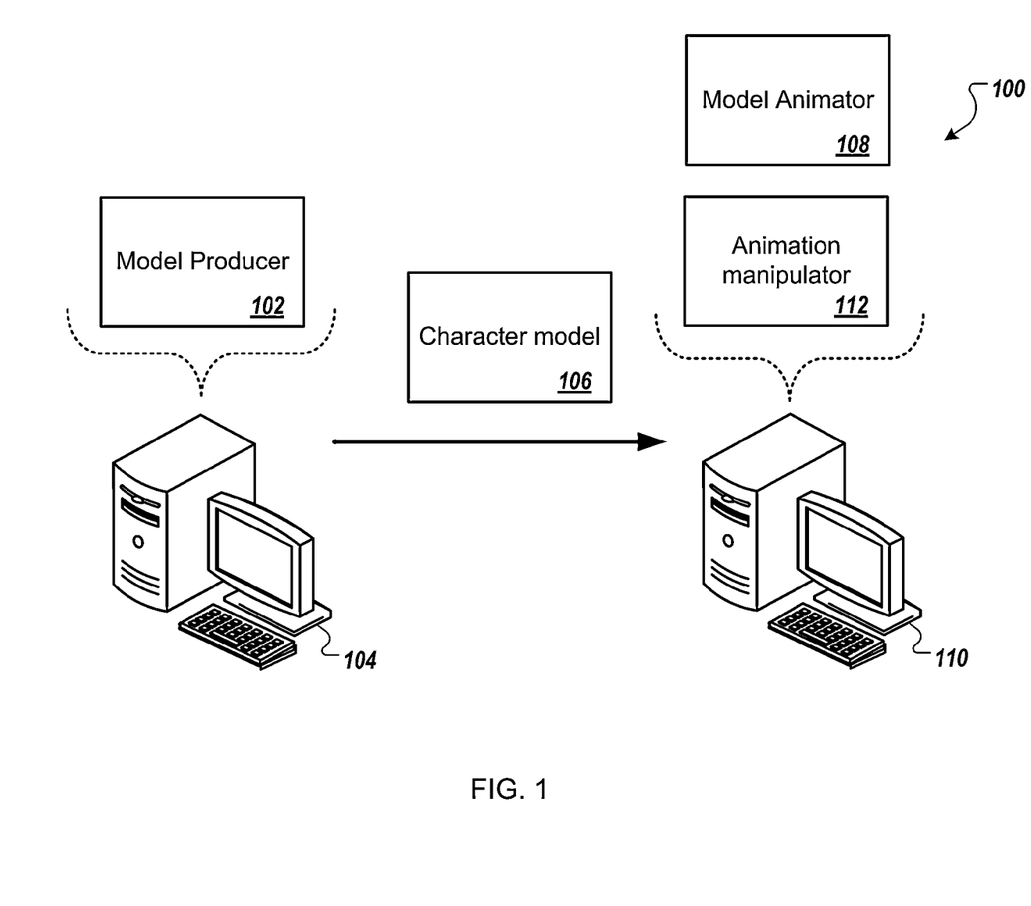
FIG. 1 illustrates an exemplary animation development system.

Referring to FIG. 1, an animation development system 100 provides functionality such as producing various types of geometrical character models for use in projects such as offline applications (e.g., animated film productions) and online applications (e.g., video game titles, virtual environments, etc.). Generally, the system 100 can be considered a type of animation pipeline that includes stages for producing animations. The models produced by the pipeline may represent a variety of characters and other types of objects that provide animated performances in projects under production. One or more techniques may be used for producing such models. For example, data may be collected from various sources (e.g., via motion capture systems), created (e.g., electronically sculpted) by a modeler or similar individual and retrieved (e.g., from character libraries). Techniques that utilize blend shapes, skinning, etc. may be used for incorporating features into one or more models. For example, a blend shape may be incorporated into the model to assist a range of representations being provided such as a range of facial expressions (e.g., from a rest expression to an expression of extreme happiness). In general, a blend shape provides a collection of relative displacements of vertices to define a particular facial expression. For example, an animated character's face can be represented as a collection of vertices (e.g., a three-dimensional mesh) and each vertex may be positioned to define a particular geometry. Typically, the vertices are placed in rest positions to define a neutral facial expression (referred to as a rest geometry) and may be deformed to produce a range of expressions. From this neutral expression, a blend shape defines the displacement of each vertex to produce each expression included in the range. For example, applying the displacements to the vertices of the neutral expression, another expression (e.g., a smiling face, a frowning face, etc.) is produced. Geometrical meshes or other types of spatial representations may be used to define such character models (or other types of objects) with varying levels of detail. In this exemplary arrangement, production of such models is represented as being provided by a model producer 102 that is executed on a computer system 104. User input (e.g., via one or more user interfaces) and data from information sources (e.g., one or more storage units, other computer systems, etc.) in communication (e.g., via the Internet) with the computer system 104 may be used for model production. Further, once produced, the models may be archived in one or more storage structures and devices for later retrieval and use in project production (e.g., feature film or video game title creation).

In this arrangement, upon being produced, a character model 106 is passed along the animation pipeline for additional processing, e.g., the model is used to produce one or more animations. To provide such functionality in this arrangement, a model animator 108 is executed by another computer system 110 and allows an individual (e.g., an animator) to select and control the character model 106 for producing animations. For example, the animator may interact with the computer system 110 (e.g., through one or more interfaces) to deform or initiate other types of adjustments (e.g., changing facial expressions) to the character model 106 for creating a particular character performance. From such detailed crafting, various types of content may be included in animations produced by the model animator 108, for example, one or more characters (e.g., moving or stationary) or other types of objects (e.g., clothing) may be represented in animations. From one of many examples, an animation may be produced that represents facial features of a character (provided by the character model 106) for a online application such as a video game. Over a series of produced frames, the animation may illustrate the character changing its facial expressions (e.g., facial movements in relation to speech).

During this animation stage, an animator may notice that portions of the character model (being animated) are missing, improperly positioned, or improperly interacting with other portions of the character model (e.g., the corner of a character's mouth appears to incorrectly move as the mouth opens and closes). For conventional systems, an animator may be unable to alter the geometry of a base model to address such imperfections. Often an animator may have to return the base model to an earlier stage in the animation pipeline for adjustments. For example, the model may be returned to the modeler creation of additional shapes (referred to as corrective shapes), which may be passed to another individual (e.g., a rigger) for incorporation into the model. Such operations can be expensive both in wasted production time and cost. Other systems may allow an animator to craft and add such corrective shapes to a models to adjust or fix the imperfections. However, many such shapes (e.g., tens or hundreds of shapes) may need to be added to attain the desired animation. Further, a dedicated control associated with each added shape (e.g., represented with a graphical slider) may need to be independently adjusted by the animator to provide an appropriate geometry. As such, the addition of more shapes may increase the workload of the animator along with the complexity of the character model 106.

In conventional systems, skinning deformations are applied relative to the rest positions of associated influence objects and transforms. As such, each applied deformation (e.g., a skinning influence) may be unaware of earlier applied deformations and may cause undesired changes previously applied deformations. Often to address unwanted changes, further deformations may need to be applied, which may in turn cause further difficulties. As such, cyclical dependencies may be created among deformations, thereby causes more lost production time and resources. To break such destructive cycles of dependences and recursive changes to initially applied deformations, future deformations may be applied relative to previously applied deformations. As such, rather than only the positions of the influences at rest providing a reference, a previously applied deformation (referred to as a primary deformation) would also provide a reference for a later applied deformation (referred to as a secondary deformation). By providing this reference, a secondary deformation could be considered as being aware of a primary deformation and as being applied to a non deformed space. Further, the secondary deformation could in effect "ride" upon the surface of the primary deformation as the surface changes over time.

To allow an animator to apply a secondary deformation (to refine animation details), after an initial deformation has been applied, an animation manipulator 112 is also executed by the computer system 110. By using the animation manipulator 112, an animator may directly apply one or more secondary deformations to a character model that has been previously deformed. Further, animation adjustments provided by the animation manipulator 112 (e.g., fill gaps, adjust shapes, etc.) may track the previously applied animation deformations. For example, the animation manipulator 112 may adjust the corners of a character's mouth, which has been previously deformed for animation (e.g., adjusted for opening and closing). During animation, the secondary deformations applied to the corners of the character's mouth would adjust (e.g., change position) relative to the movements of the primary deformation (e.g., as the character's mouth opens and closes).

In this particular arrangement, two computer systems 104 and 110 are illustrated as providing the animation pipeline of the animation development system 100. However, other arrangements may be implemented for providing such functionality. For example, the functionality of the model producer 102, the model animator 108 and the animation manipulator 112 may be executed on a single computer system (e.g., computer system 104) or distributed across many computer systems (e.g., three or more systems) or other types of computing devices.

Figure 2:
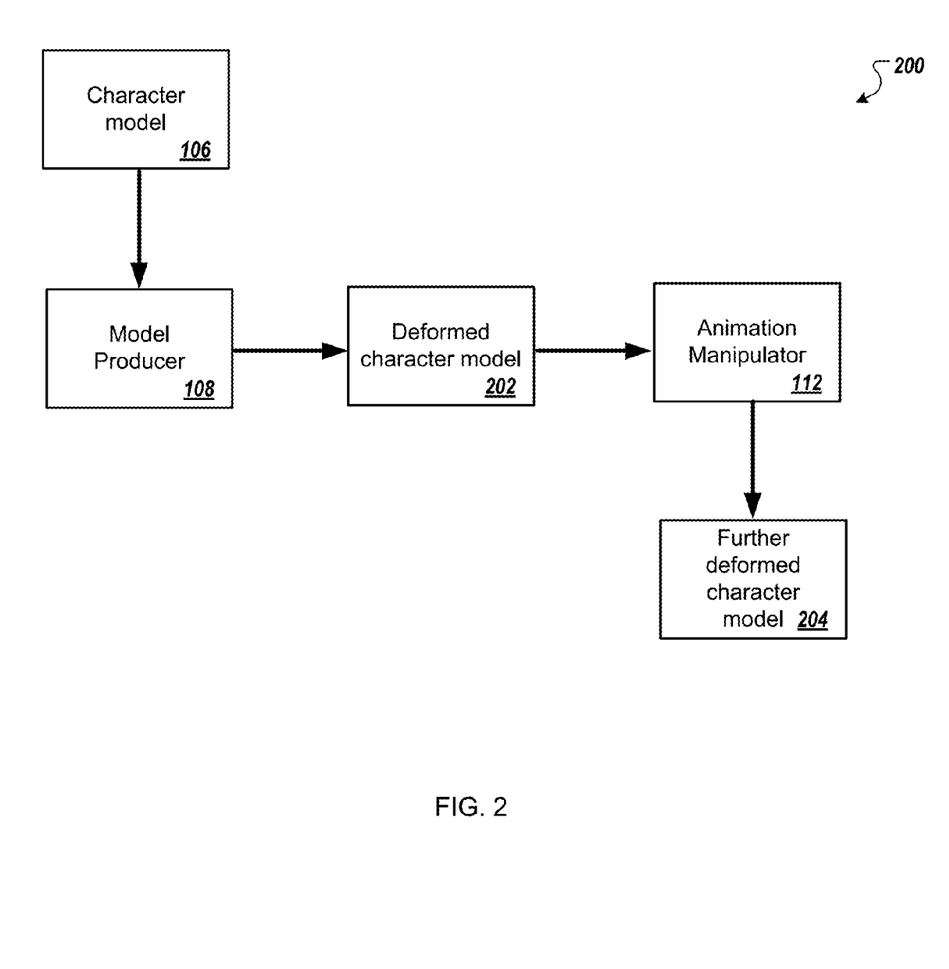
FIG. 2 illustrates operations of an animation development system.

Referring to FIG. 2, an operational chart 200 graphically illustrates some of the operations executed by the animation development system 100 (shown in FIG. 1) for deforming a character model after initially applying one or more deformations. Upon being produced (e.g., electronically sculpted), the character model 106 is provided to the model producer 108 and the model is deformed in manner for a particular performance (e.g., changes to facial expressions and mouth movements to synchronize with speech). By applying such deformations, a deformed character model 202 is produced that may be reviewed by one or more animators next in the animation pipeline. Based upon the review, additional deformations may need to be applied to the deformed character model 202 for producing an animation. For example, features may need to be refined (e.g., fill in a gap) or corrected (due to interfering shapes), etc. Upon identifying the adjustments still needed, the deformed character model 202 may be modified by the animation manipulator 112 (or multiple animation manipulators) to introduce additional deformations and produce a character model with additional deformations 204. If associated with a primary deformation, each secondary deformation is applied by the animation manipulator 112 relative to the respective primary deformation.

By applying a secondary deformation relative to a primary deformation, the local geometry of the primary deformation, upon which the secondary deformation is positioned, may influence the secondary deformation. For example, bound to the local geometry of the primary deformation, the position of the secondary deformations may change based upon movement of the primary deformation. Various techniques may be utilized to apply a secondary deformation relative to a primary deformation. For example, a transform (that represents a secondary deformation) may be applied to a group of vertices that have been previously deformed. By transforming the vertices relative to the previous deformation, in effect a link is established between the secondary and primary deformations. By providing such transforms, animation manipulators allow animators to use multiple degrees of freedom for adjusting character model geometries. For example, translation, scale, rotation, shear (and combinations thereof) are some degrees of freedom associated with transforms that may be applied by an animation manipulator.

To represent a secondary deformation being applied relative to a previously applied primary deformation, the deformed position of a single vertex as a function of time may be represented as:

$$v(t) = \sum_i (\alpha_i E_i(t)) v_{in}(t); \quad (1)$$

in which $v_{in}(t)$ is the initial position of the vertex, $\alpha_i$ are skinning weights and $E_i(t)$ are skinning matrices that represent a combination of linear transformations. Each skinning matrix can be represented as:

$$E_i(t) = G^{-1}(t) M_i(t) B_i^{-1}(t) G(\text{rest}). \quad (2)$$

In equation (2), the matrix G is associated with the rest geometry of the model and provides a base reference for the primary deformation, which is represented by the matrix B. The matrix M represents the secondary deformation relative to the primary deformation. As such, the matrix B may be considered as providing an arbitrary coordinate system based on the primary deformation. For comparison, conventional skinning matrices can be represented as:

$$E_i(t) = G^{-1}(t) M_i(t) M_i^{-1}(\text{rest}) G(\text{rest}); \quad (3)$$

in which the secondary deformation, represented by matrix M, is applied with reference to the rest geometry of the secondary deformation and the global coordinates provided the matrix G (and not an arbitrary coordinate system). In equation (2), the dimensions of the matrix $E_i(t)$ may depend upon the degrees of freedom being provided, for example, a 3×3 matrix provides nine degrees of freedom (e.g., three degrees for translation, three degrees for scale and three degrees for rotation), however other matrices may be used to provide additional degrees of freedom (e.g., three degrees for shear). Other transforms and similar operators may be used for defining a secondary deformation relative to primary deformation as provided by an animation manipulator.

Figure 3:
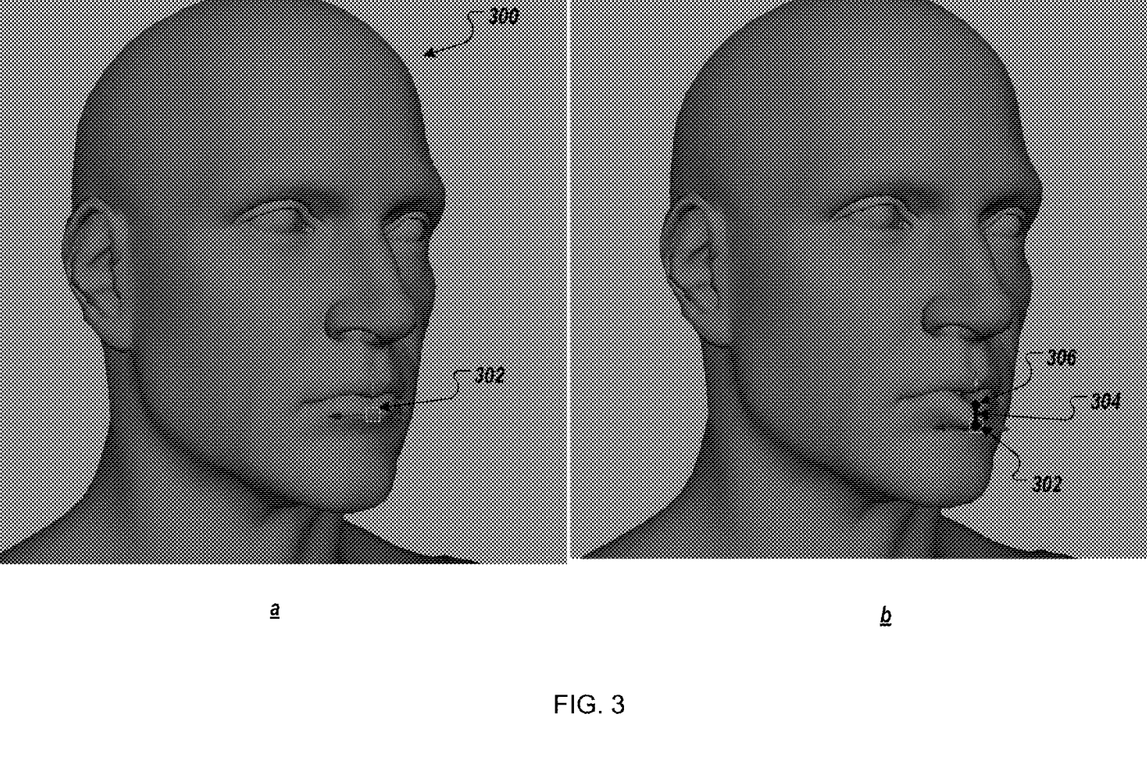
FIGS. 3 and 4 include a series of images that illustrate an animated character being manipulated.
Figure 4:
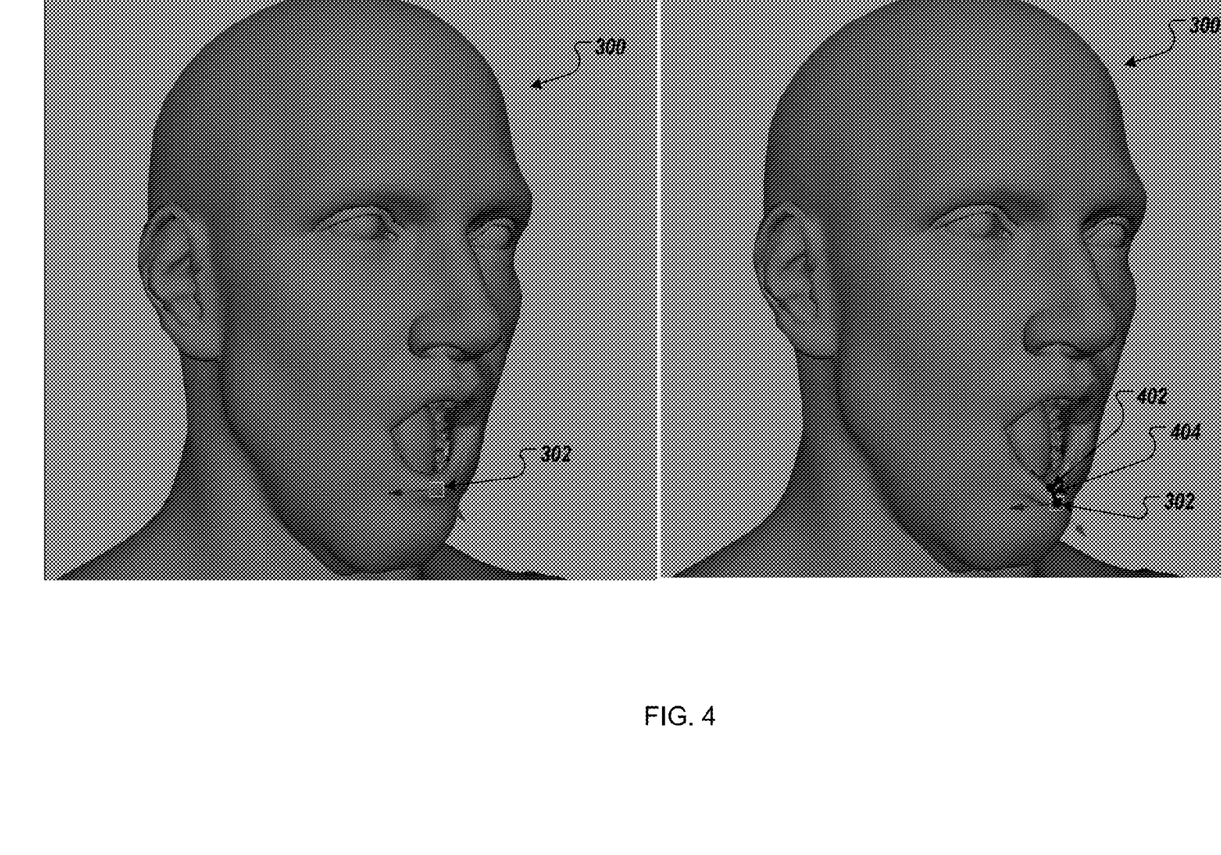

Referring to FIGS. 3 and 4, a series of images illustrate deforming a character model with an animation manipulator. In this example, a single or combination of blend shapes (or other similar modeling techniques) may be used to produce a representation of a deformable face 300 from a character model, as shown in FIG. 3a. To expand the facial expressions provided by the character model (e.g., provide more intense expressions), a series of manipulators is distributed across surfaces of the model. Each of the manipulators allows a user (e.g., an animator) to deform the local geometry (e.g., neighboring vertices) associated with the location that the manipulator is positioned. For example, a manipulator may apply one or more transforms to adjust features of the character's face (e.g., to produce a more extreme facial expression). The ability to adjust features of a facial expression is directly proportional to the number of manipulators positioned on the model. In this particular example, approximately thirty manipulators are positioned on or closely adjacent to the mouth of the character and approximately twenty animation manipulators are positioned on or closely adjacent to the eyes of the character. For illustration, a manipulator 302 is selected (e.g., by an animator) that is located on the lower lip of the character. Along with being located on the surface of the lower lip, deformations provided by the manipulator 302 are relative to the local geometry of the lower lip surface and any previously applied deformations. In this arrangement, deformations are applied by the manipulator 302 as directed by user interaction (e.g., using a pointing device such as a mouse). As presented in FIG. 3b, the manipulator 302 is translated in the downward direction (e.g., as represented by with line 304) from a starting position represented with a point 306. In this example, due to the translation, the central portion of the character's lower lip drops. Additionally, while the position of the manipulator 302 is translated downward, the manipulator remains on the same surface location of the character's lower lip. As such, a secondary deformation is applied by the manipulator 302 (e.g., pulling of the central portion of the lower lip) and the manipulator retains its location relative to the primary deformation of the lower lip.

Referring to FIG. 4a, the manipulator 302 remains on the surface of the character's lower lip, however, the character model is adjusted (e.g., through user interaction) to present a facial expression with the character's jaw lowered. So, the manipulator retains its relative local position as the model is deformed by a source (e.g., a jaw position controller) that is separate from location of the manipulator (e.g., the character's lower lip). As such, the manipulator 302 may maintain a relationship with a particular location of a character model (e.g., a surface position), even as the location moves based upon the transformation of another portion of the model (e.g., the character's jaw). Along with jaw movements, other remote transformation sources (e.g., separate from local position of the manipulator 302) may cause the manipulator to change position. For example, a deformation such as rotating the character's head upon its shoulders would cause the manipulator to change position with the lower lip of the character.

Similar to local deformations, after being deformed once or multiple times by a remote deformation source (e.g., jaw movements, head rotations, etc.), animation manipulators can be user-directed to provide a secondary deformation. For example, as illustrated in FIG. 4b, the manipulator 302 is translated in a downward direction from a position (e.g., represented by a point 402) by an amount equivalent to the distance traveled in FIG. 3b (as represented by the line 404) to further expose the interior of the character's mouth. As such, the manipulator 302 is capable of locally applying a secondary deformation to the local geometry relative to an initial deformation provided by a remote source. In this particular example, an animation manipulator uses translation to adjust an associated model location, however, other types of movements may also be implemented. For example, scaling, rotation and other types of manipulations may be provided through the degrees of freedom accessible by the animator for adjusting a character model. Further, additional animation manipulators may also be used for locally adjusting other geometries of a character model.

Figure 5:
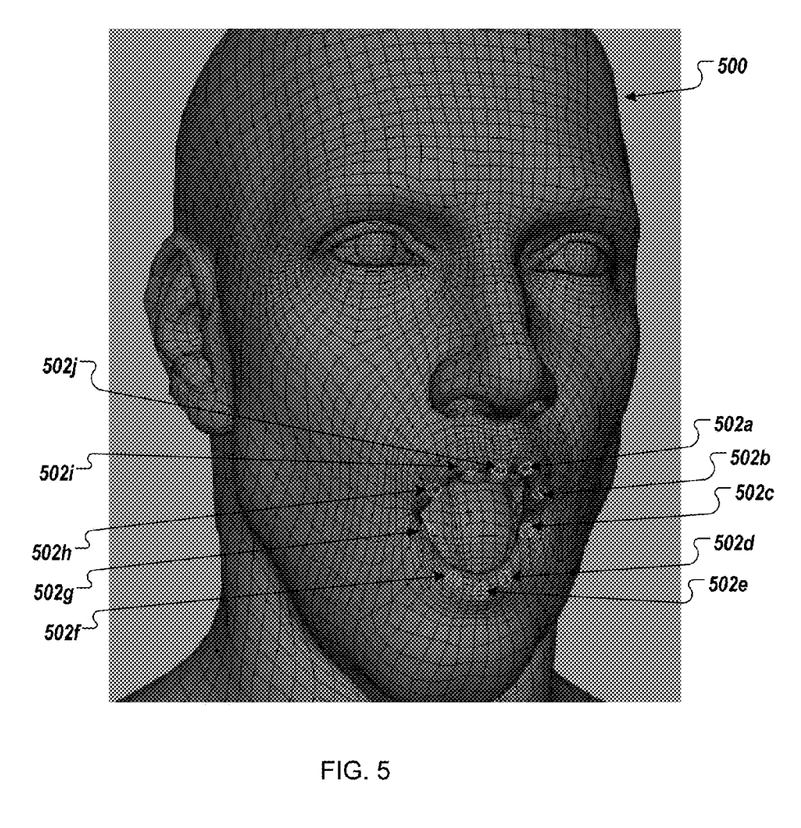
FIG. 5 illustrates a group of animation manipulators positioned on an animated character.

Referring to FIG. 5, an illustrated representation of a deformable face 500 is produced from a character model. Once initially deformed (e.g., from skinning of the character's jaw and one or more blend shapes), the representation 500 may be provided for animation production. However, additional deformation or adjustments may be needed (e.g., as determined by an animator) for animation production. To further deform the representation 500, for example, to refine the facial expression provided, the animator may position a series of manipulators across one or more surfaces of the deformable face 500. In one scenario, a group of manipulators may be distributed around the circumference of the open mouth of the character. In this illustrated example, ten manipulators 502a-j are positioned in substantially equivalent angular steps around the open mouth. Similar to the manipulator illustrated in FIGS. 3 and 4, the ten manipulators 502a-j allow an animator to directly (and intuitively) manipulate local surfaces of a character model by applying secondary deformations. Further, by assigning each of the manipulators 502a-j to a particular location (and a corresponding local coordinate system), each manipulator may be capable of following surface movements experienced at the respective local positions based upon primary deformations associated with local geometries (e.g., the surfaces upon which the manipulators are located). As such, orientation changes of a manipulator and corresponding secondary deformation may be provided from a primary deformation. Other sources may effect the orientation of secondary deformations, for example, skinning based upon the action of one or more joints (e.g., bending of the character's neck) could also provide orientation changes.

Along with being controlled by an animator, or other type of user, adjustments provided by one or more manipulators may be initiated and used to return a character feature to predetermined state. For example, certain facial expressions may be uniquely identifiable with a character (e.g., the manner in which a character smiles, or squints, etc.). As such, an animator may want the animated character to project the same signature facial expressions when called upon for particular instances (e.g., scenes) of a performance. Upon using one or more manipulators to create a signature expression, the animator may provide input (e.g., through a user interface) to indicate that the expression should be considered invariant (with regard to the animation development system). Upon returning the character to that particular expression (e.g., dialing up the expression with one or more blend shapes), adjustments provided by the manipulators are similarly re-applied to return the character's face to the signature expression. One or more techniques may be implemented for re-applying such deformation from the manipulators, for example, upon being indicated as an invariant expression (sometimes referred to as a key frame), information associated with the character model (e.g., dialed in blend shape values) and the manipulators (e.g., transforms applied by the manipulators) may be stored for later retrieval (to return character's face to the invariant expression). For expressions not tagged as invariant, transforms provided by manipulators may not return the expression. For example, after transitioning from one facial expression to another, an animator may apply a manipulator (or multiple manipulators) to adjust the later facial expression. Upon being returned to the former facial expression, the expression may appear different due to the introduction of the manipulator (or manipulators), and corresponding transforms, which are not bound to return the facial expression to an invariant expression.

Figure 6:
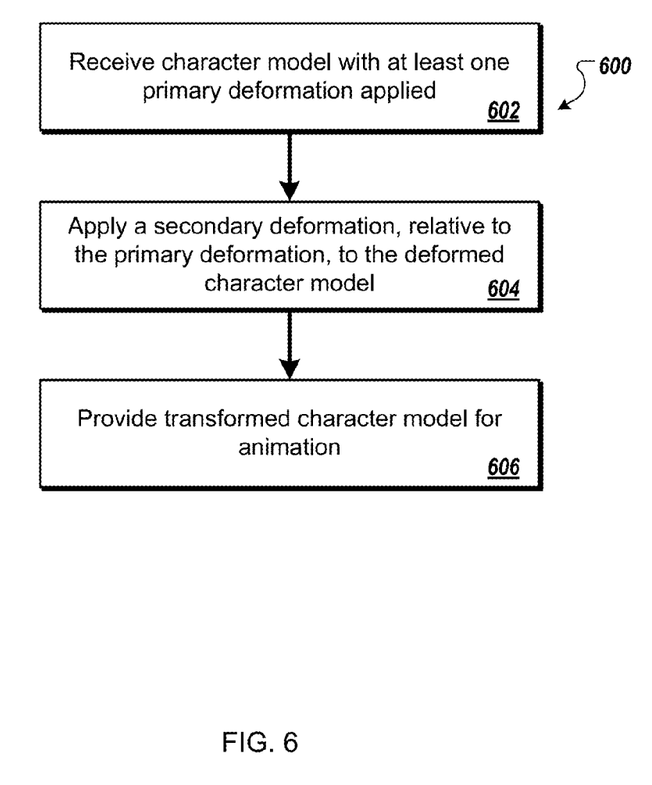
FIG. 6 is a flowchart of operations of an animation manipulator.

Referring to FIG. 6, a flowchart 600 represents some of the operations of the animation manipulator 112 (shown in FIG. 1). The operations may be executed by a single computer system (e.g., computer system 110) or multiple computing devices. Along with being executed at a single site (e.g., at one computer system), operation execution may be distributed among two or more sites.

Operations include receiving 602 a character model that has at least one primary deformation applied (e.g., from blend shape adjustments, skinning, etc.). To allow an animator (or other individual) to further adjust the character model (e.g., adjust a facial expression provided by the model) relative to the primary deformation, operations also include applying 604 a secondary transformation, relative to the primary deformation, to the previously deformed character model. For example, a transform with one or more degrees of freedom and that accounts for previous deformations to the character model may be applied. As illustrated in FIG. 5, one or multiple manipulators (e.g., manipulators 500a-j) may be applied to a portion of the deformed model to refine features (e.g., portions of a facial expression) of a character model. For example, a feature (e.g., corner of the character's mouth) may be translated and slightly rotated (as a secondary deformation) to provide a more recognizable facial expression (e.g., project an emotion of surprise). Upon applying the secondary deformation, relative to the primary deformation, operations may include providing 606 the transformed character for further processing, such as animation production.

To perform the operations described in flow chart 500, the animation manipulator 112 may perform any of the computer-implemented methods described previously, according to one implementation. For example, a computer system such as computer system 110 (shown in FIG. 1) may execute the animation manipulator 112. The computer system may include a processor (not shown), a memory (not shown), a storage device (e.g., storage device 404), and an input/output device (not shown). Each of the components may be interconnected using a system bus or other similar structure. The processor is capable of processing instructions for execution within the computer system. In one implementation, the processor is a single-threaded processor. In another implementation, the processor is a multi-threaded processor. The processor is capable of processing instructions stored in the memory or on the storage device to display graphical information for a user interface on the input/output device.

Figure 7:
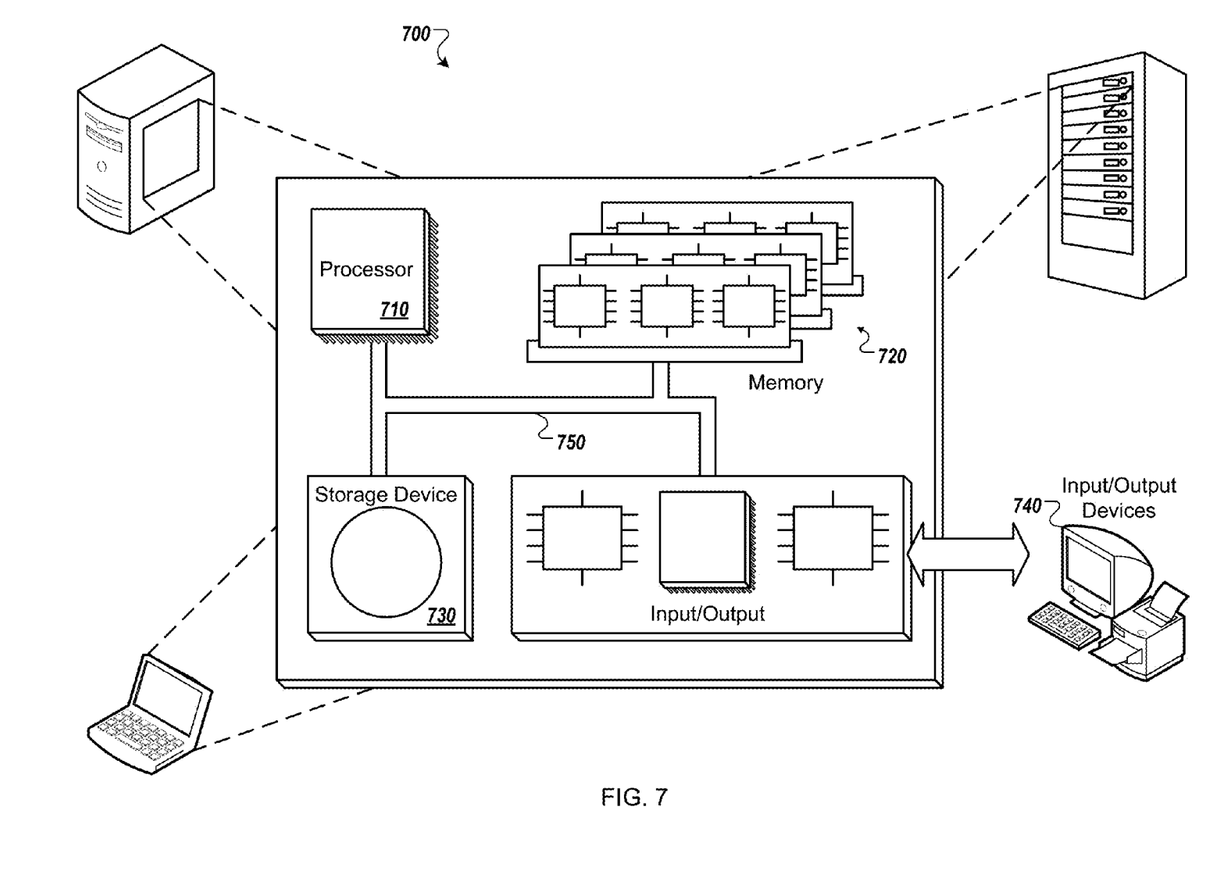
FIG. 7 represents a computer system and related components.

FIG. 7 is a schematic diagram of a generic computer system 700. The system 700 can be used for the operations described in association with any of the computer-implemented methods described previously, according to one implementation. The system 700 includes a processor 710, a memory 720, a storage device 730, and an input/output device 740. Each of the components 710, 720, 730, and 740 are interconnected using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730 to display graphical information for a user interface on the input/output device 740.

The memory 720 stores information within the system 700. In some implementations, the memory 720 is a computer-readable medium. The memory 720 is a volatile memory unit in some implementations and is a non-volatile memory unit in other implementations.

The storage device 730 is capable of providing mass storage for the system 700. In one implementation, the storage device 730 is a computer-readable medium. In various different implementations, the storage device 730 may be a floppy disk device, a hard disk device, an optical disk device, or a tape device.

The input/output device 740 provides input/output operations for the system 700. In one implementation, the input/output device 740 includes a keyboard and/or pointing device. In another implementation, the input/output device 740 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the following claims.

What is claimed is:

1. A computer-implemented method comprising:
receiving, by a computer system, a model that represents a geometry of a facial expression of an animated character;
applying, by the computer system, a primary deformation applied to the geometry of the facial expression, wherein:
the primary deformation is applied relative to a rest geometry of the facial expression; and
the primary deformation is defined by a primary deformation matrix; and
applying, by the computer system and after applying the first deformation, a secondary deformation to the geometry of the facial expression, wherein:
the secondary deformation is defined by a secondary deformation matrix; and
the secondary deformation is applied using an inverse of the primary deformation matrix and the secondary deformation matrix.

2. The computer-implemented method of claim 1, wherein applying the secondary deformation includes applying a transform to a portion of the geometry of the received character model.

3. The computer-implemented method of claim 1, wherein the primary deformation and the secondary deformation are applied to equivalent portions of the geometry of the character.

4. The computer-implemented method of claim 1, wherein the primary deformation and the secondary deformation are applied to different portions of the geometry of the character.

5. The computer-implemented method of claim 1, wherein the primary deformation includes adjusting a shape associated with the model.

6. The computer-implemented method of claim 1, wherein the primary deformation includes applying a skin to the model.

7. The computer-implemented method of claim 1, wherein the primary deformation is preserved as the character model is animated.

8. The computer-implemented method of claim 1, wherein the secondary deformation is preserved as the character model is animated.

9. The computer-implemented method of claim 1, further comprising:
identifying the geometry of the received character model applied with the secondary deformation as being an invariant pose.

10. The computer-implemented method of claim 9, further comprising:
upon adjusting the geometry of the received character model applied with the secondary deformation, returning the adjusted geometry to the invariant pose.

11. The computer-implemented method of claim 1, wherein a user interaction identifies a portion of the geometry of the received character model for applying the secondary deformation.

12. A computer program product tangibly embodied in a non-transitory medium and comprising instructions that when executed by a processor perform a method comprising:
receiving a model that represents a geometry of a facial expression of an animated character;
applying a primary deformation applied to the geometry of the facial expression, wherein:
the primary deformation is applied relative to a rest geometry of the facial expression; and
the primary deformation is defined by a primary deformation matrix; and
applying, after applying the first deformation, a secondary deformation to the geometry of the facial expression, wherein:
the secondary deformation is defined by a secondary deformation matrix; and
the secondary deformation is applied using an inverse of the primary deformation matrix and the secondary deformation matrix.

13. The computer program product of claim 12, wherein applying the secondary deformation includes applying a transform to a portion of the geometry of the received character model.

14. The computer program product of claim 12, wherein the primary deformation and the secondary deformation are applied to equivalent portions of the geometry of the character.

15. The computer program product of claim 12, wherein the primary deformation and the secondary deformation are applied to different portions of the geometry of the character.

16. The computer program product of claim 12, wherein the primary deformation includes adjusting a shape associated with the model.

17. The computer program product of claim 12, wherein the primary deformation includes applying a skin to the model.

18. The computer program product of claim 12, wherein the primary deformation is preserved as the character model is animated.

19. The computer program product of claim 12, wherein the secondary deformation is preserved as the character model is animated.

20. The computer program product of claim 12, wherein the method further comprises:
identifying the geometry of the received character model applied with the secondary deformation as being an invariant pose.

21. The computer program product of claim 20, wherein the method further comprises:
upon adjusting the geometry of the received character model applied with the secondary deformation, returning the adjusted geometry to the invariant pose.

22. The computer program product of claim 12, wherein a user interaction identifies a portion of the geometry of the received character model for applying the secondary deformation.

23. A system comprising:
one or more memories configured to store instructions; and
one or more processors configured to execute the instructions to perform a method comprising:
receiving a model that represents a geometry of a facial expression of an animated characters;
applying a primary deformation applied to the geometry of the facial expression, wherein:
the primary deformation is applied relative to a rest geometry of the facial expression; and
the primary deformation is defined by a primary deformation matrix; and
applying, after applying the first deformation, a secondary deformation to the geometry of the facial expression, wherein:
the secondary deformation is defined by a secondary deformation matrix; and
the secondary deformation is applied using an inverse of the primary deformation matrix and the secondary deformation matrix.

24. The system of claim 23, wherein applying the secondary deformation includes applying a transform to a portion of the geometry of the received character model.

25. The system of claim 23, wherein the primary deformation and the secondary deformation are applied to equivalent portions of the geometry of the character.

26. The system of claim 23, wherein the primary deformation and the secondary deformation are applied to different portions of the geometry of the character.

27. The system of claim 23, wherein the primary deformation includes adjusting a shape associated with the model.

28. The system of claim 23, wherein the primary deformation includes applying a skin to the model.

29. The system of claim 23, wherein the primary deformation is preserved as the character model is animated.

30. The system of claim 23, wherein the secondary deformation is preserved as the character model is animated.

31. The system of claim 23, wherein the method further comprises:
identifying the geometry of the received character model applied with the secondary deformation as being an invariant pose.

32. The system of claim 31, further the method further comprises:
upon adjusting the geometry of the received character model applied with the secondary deformation, returning the adjusted geometry to the invariant pose.

33. The system of claim 23, wherein a user interaction identifies a portion of the geometry of the received character model for applying the secondary deformation.

* * * * *

UNITED STATES PATENT AND TRADEMARK OFFICE
CERTIFICATE OF CORRECTION

| | |
|---|---|
| PATENT NO. | : 8,860,731 B1 |
| APPLICATION NO. | : 12/793249 |
| DATED | : October 14, 2014 |
| INVENTOR(S) | : Julien F. Cohen Bengio, Frederic P. Pighin and Michael Koperwas |

It is certified that error appears in the above-identified patent and that said Letters Patent is hereby corrected as shown below:

In the Claims

In claim 23, column 12, line 19,
  delete "characters;" and insert "character;" so the line reads as "expression of an animated character;"

Signed and Sealed this
Seventeenth Day of March, 2015

Michelle K. Lee
*Director of the United States Patent and Trademark Office*